United States Patent [19]
Okada et al.

[11] Patent Number: 6,024,185
[45] Date of Patent: Feb. 15, 2000

[54] BODY STRUCTURE OF MOTORCYCLE

[75] Inventors: Megumu Okada; Hiromi Sumi; Kouichi Kobayashi; Naoshi Iizuka; Yoshitaka Seki; Naoyuki Saitou, all of Saitama, Japan

[73] Assignee: Honda Giken Kogyo Kabushikhi Kaisha, Tokyo, Japan

[21] Appl. No.: 08/915,569

[22] Filed: Aug. 21, 1997

[30] Foreign Application Priority Data

Aug. 23, 1996 [JP] Japan .................................. 8-222840
Nov. 29, 1996 [JP] Japan .................................. 8-319978

[51] Int. Cl.[7] .................................................. B16D 61/02
[52] U.S. Cl. .......................................... 180/227; 180/228
[58] Field of Search .................................. 180/218, 219, 180/223, 227, 228

[56] References Cited

U.S. PATENT DOCUMENTS

| | | | |
|---|---|---|---|
| 4,789,042 | 12/1988 | Pitts | 180/231 |
| 5,011,459 | 4/1991 | Van De Vel | 474/101 |

FOREIGN PATENT DOCUMENTS

| | | |
|---|---|---|
| Y2-57-35619 | 8/1982 | Japan . |
| 61-10291 U | 1/1986 | Japan . |
| 1-57982 U | 4/1989 | Japan . |
| 1-175590 | 7/1989 | Japan . |
| 1-170090 U | 11/1989 | Japan . |
| 1-306384 | 12/1989 | Japan . |
| Y2-6-49506 | 12/1994 | Japan . |

*Primary Examiner*—Chris Schwartz
*Assistant Examiner*—C. T. Bartz
*Attorney, Agent, or Firm*—Birch, Stewart, Kolasch & Birch, LLP

[57] ABSTRACT

A crankcase for a motorcycle is divided into an upper half and a lower half. A crankshaft, a main shaft, a counter shaft, and a pivot portion are arranged substantially on a straight line along a parting plane P of the crankcase. An eccentric cam and a pivot collar are disposed in the pivot portion, and a rear swing arm is connected to the pivot shaft. The upper half and lower half are vertically mated to each other in front of and behind the pivot portion and then vertically fastened to each other. The center of the pivot collar is offset downwardly from the parting plane P.

15 Claims, 8 Drawing Sheets

BODY STRUCTURE OF MOTORCYCLE

BACKGROUND OF THE INVENTION

1. Field of the Invention

The present invention relates to a body structure of a motorcycle, in which a rear swing arm is mounted on a pivot portion of a crankcase.

2. Description of Background Art

Japanese Patent Laid-open No. Hei 1-306384 and Japanese Utility Model Laid-open No. Hei 1-170090 disclose body structures of motorcycles of a type in which a pivot portion is provided on a rear portion of a crankcase and a rear swing arm is directly mounted on the pivot portion.

Japanese Utility Model Laid-open No. Hei 1-57982 discloses a body structure of a motorcycle, in which a link is mounted on a rear portion of a crankcase and a rear swing arm is mounted on the link.

Japanese Patent Laid-open No. Hei 1-175590 discloses a body structure of a motorcycle, in which a pivot portion having an eccentric cam is provided on a vertically extending frame and a rear swing arm is mounted on the pivot portion.

Japanese Utility Model Publication No. Sho 57-35619 discloses a structure in which steps are directly mounted on side surfaces of a crankcase. Japanese Utility Model Laid-open No. Sho 61-10291 discloses a body structure of a motorcycle, in which step holders and a rear swing arm are co-fastened to a frame using a pivot shaft. The above-described document, Japanese Patent Laid-open No. Hei 1-306384 discloses a structure in which a side stand is mounted to a crankcase through a bracket.

Japanese Utility Model Publication No. Hei 6-49506 discloses a motorcycle in which a main frame extending rearwardly from a head pipe is formed into an eye-like shape in cross-section. A down-frame extends downwardly from a front portion of the main frame. A pivot frame extends downwardly from a rear end portion of the down-frame. An engine is supported by these frames and a rear swing arm 16 is rockably supported on the pivot frame.

The provision of a pivot portion on a crankcase is useful not only for improving the running performance of a motorcycle, but also for reducing the width of the body and reducing the weight of the body because of the provision of no pivot frame.

In each of the related art structures for the pivot portions, however, there occurs a problem that the assembly of a pivot portion requires a lot of labor in the process of assembling a body having such a structure because a crankcase seems to be divided right and left in accordance with a usual manner. Accordingly, it is expected to further improve the assembling performance of the pivot portion.

In the case where a pivot portion is directly mounted to a crankcase, a mounting portion thereof requires a high rigidity, so that a peripheral portion of the pivot portion must be enlarged or a separate member for supporting a rear swing arm must be provided.

Further, a mounting space for steps or the like requiring a sufficient mounting strength must be additionally ensured, and in the case where the steps or the like are mounted on the crankcase, there occurs the same problem as described above, that is, the mounting portions for the steps on the engine side must be enlarged.

In the case where a pivot frame is provided as in Japanese Utility Model Publication No. Hei 6-49506, since a twisting force applied from the rear wheel side to a pivot portion is dispersed and absorbed by a body frame such as a main frame, it is not so difficult to ensure the rigidity of the connection portions for connecting an engine to the body frame. However, in the case where such a pivot frame is not provided, it becomes very important to ensure the rigidity of the connecting portions for connecting the engine to the body frame.

SUMMARY AND OBJECTS OF THE INVENTION

To solve the above problems, according to the present invention, there is provided a body structure for a motorcycle including a head pipe turnably supporting a front fork supporting a front wheel. A body frame extends rearwardly from the head pipe. An engine is supported downwardly from the body frame. A rear swing arm is provided having a front end portion rockably supported on a rear portion of a crankcase through a pivot shaft. A rear wheel is supported on a rear end portion of the rear swing arm. The crankcase is divided into upper and lower parts and a pivot portion is provided for supporting the pivot shaft along a parting plane of the crankcase.

The pivot portion may support a pivot collar through which the pivot shaft passes. The upper and lower parts of the crankcase may be vertically fastened to each other at fastening portions positioned in front of and behind the pivot collar.

A wall thickness of the fastening portion in front of the pivot collar on the front side of the body may be larger than that of the fastening portion behind the pivot collar on the rear side of the body.

A center of a pivot collar may be offset either upward or downward from the parting plane. A crankshaft, a main shaft, a counter shaft, and a pivot portion may be arranged substantially on a straight line along the parting plane. The width between axial end surfaces of the pivot portion may be substantially equal to the width between bearings supporting both ends of the main shaft and to a width between bearings supporting both ends of the counter shaft.

An eccentric cam for eccentrically supporting the pivot shaft may be provided in the pivot portion. In this case, the eccentric cam may be formed by the pivot collar. Step holders and the rear swing arm may be cofastened to side surfaces of the crankcase using the pivot shaft.

Further to the above, according to the present invention, there is also provided a body structure for a motorcycle including a head pipe turnably supporting a front fork supporting a front wheel. A body frame extends rearwardly from the head pipe. An engine is supported downwardly from the body frame. A rear swing arm is provided having a front end portion rockably supported on a rear portion of a crankcase through a pivot shaft. A rear wheel is supported on a rear end portion of the rear swing arm. Connecting portions are provided for connecting the engine to the body frame in a region defined by upper and lower virtual lines, or oblique longitudinally extending lines connecting the pivot portion to upper and lower end portions of the head pipe or in the vicinity of the region. The portions for connecting the engine to the body frame may be provided on the crankcase.

Since a crankcase is divided into upper and lower parts, and a pivot portion is provided along a parting plane thereof, the assembling state of the pivot portion can be checked before the divided parts of the crankcase are vertically mated to each other. As a result, it is possible to improve the assembling performance of the pivot portion.

In the case where a crankshaft, a main shaft, a counter shaft and the pivot portion are arranged substantially on a straight line along the parting plane, the assembling performance of each shaft is further improved, and further, since each shaft serves as a reinforcing member, it is possible to improve the strength and the twisting rigidity of a peripheral portion of a pivot shaft of the pivot portion.

In the case where a pivot collar is provided in the pivot portion and the upper and lower parts of the crankcase are vertically mated and vertically fastened to each other in front of and behind the pivot collar, even if the crankcase is made of an aluminum alloy, the permanent set in fatigue of an aluminum seat surface can be prevented.

At this time, when the fastening portion on the front side of the body at which load is largely concentrated is thicker than the fastening portion on the rear side of the body, it is possible to improve the fastening performance and the twisting rigidity of the pivot collar.

In the case where a center of the pivot collar is offset either upwardly or downwardly from the parting plane, the rigidity of the pivot collar is further improved.

In the case where the width between right and left end surfaces of the pivot portion is nearly equal to the width between bearings for supporting both ends of the main shaft and also equal to the width between bearings for supporting both ends of the counter shaft, it is possible to improve the fastening performance and the twisting rigidity of the pivot collar.

In the case where an eccentric cam structure for eccentrically supporting the pivot collar is provided in the pivot portion, it is possible to eliminate the necessity of the provision of any frame part for supporting an eccentric cam. When the same engine is used for a different type of motorcycle, the pivot portion can be adjusted without the use of additional parts.

In the case where step holders are mounted on side surfaces of the crankcase by co-fastening them with the rear swing arm to the pivot portion using the pivot shaft, it is possible to mount steps to the engine having a high rigidity, and hence to reduce sizes of mounting portions thereof on the engine side.

In the case where connecting portions for connecting the engine to the body frame are provided in a region surrounded by upper and lower virtual lines connecting the pivot portion to upper and lower end portions of the head pipe or in the vicinity of the region, a twisting force applied from the rear wheel side to the pivot portion is transmitted at the portion where the engine is least susceptible to deformation.

Accordingly, it is not particularly required to reinforce the connecting portions for connecting the engine to the body frame, and further in the case where the connecting portions of the engine side to the body frame are provided on the crankcase, the rigidity of the connecting portions are easily ensured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
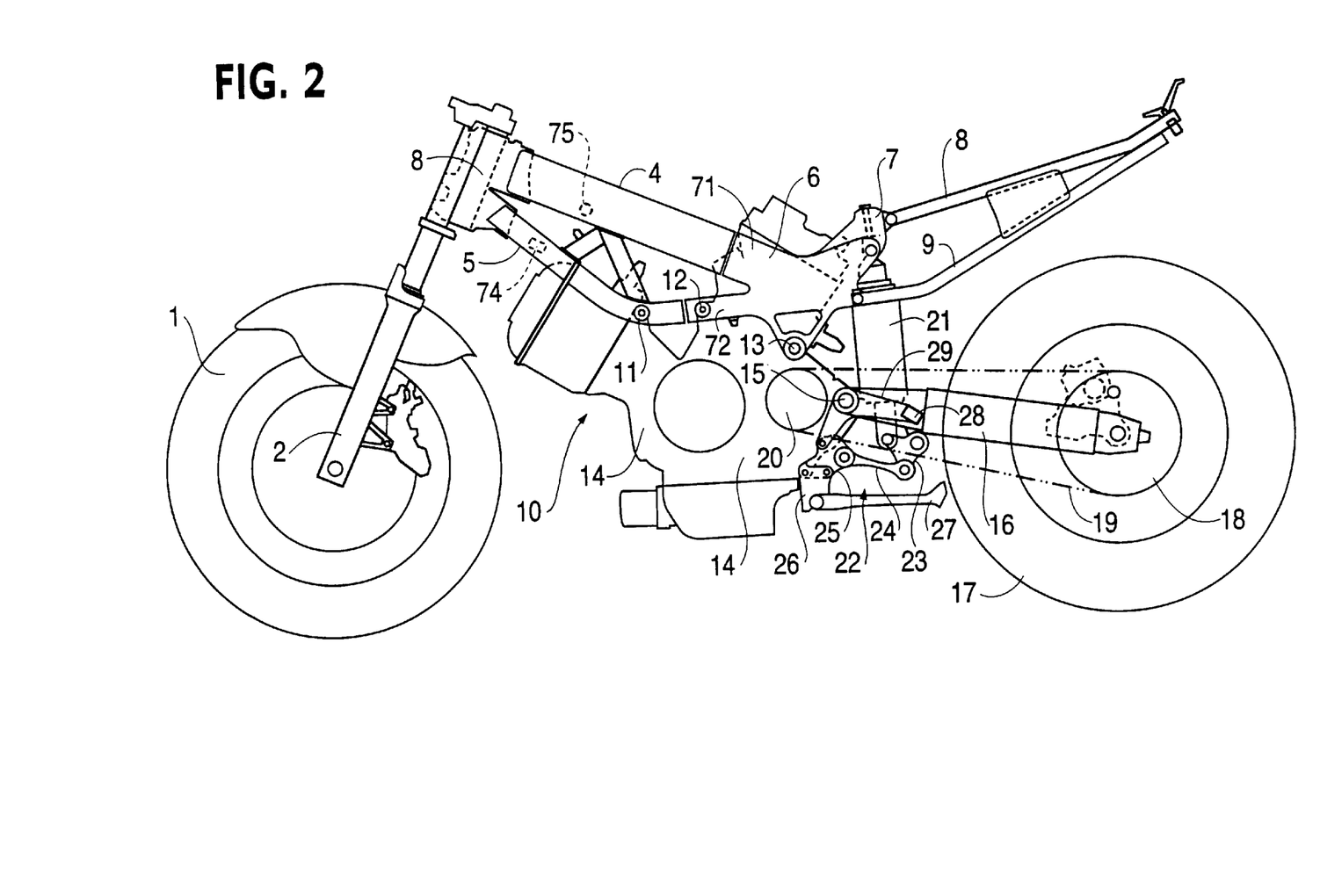
FIG. 2 is a side view of essential portions of a body of a motorcycle according to the present invention.

Referring first to FIG. 2, an upper end portion of a front fork 2 support at a lower end portion thereof a front wheel 1 and is turnably supported on a head pipe 3. Main frames 4 and sub-frames 5 extend rearwardly from the head pipe 3.

The main frame 4, which is formed substantially in a straight line shape in a side view, extends obliquely downwardly. The sub-frame 5 curvedly extends downwardly of the main frame 4.

Rear portions of the main frame 4 and the sub-frame 5 are integrally connected to a rear plate 6. A bridge 7 projects upwardly from an upper portion of a rear end of the rear plate 6. Seat rails 8 are mounted on the bridge 7 and a rear stay 9 is mounted on a lower portion of the rear end of the rear plate 6.

The main frame 4, sub-frame 5, rear plate 6, seat rails 8, and rear stay 9 constitute a body frame. In particular, the main frame 4, sub-frame 5, and rear stay 6 constitute an engine supporting portion.

A V-type engine 10 is suspended downwardly from the body frame. A front bank side of the engine 10 is connected to the sub-frame 5 with engine hangers 11. A rear bank side of the engine 10 is connected to the rear plate 6 with second engine hangers 12 and third engine hangers 13.

Each of these engine hangers 11, 12, and 13 are paired right and left, and engine side fastening portions are formed on the crankcase 14 at positions corresponding thereto. A front end portion of a rear swing arm 16 is turnably mounted on a pivot shaft 15. The pivot shaft 15 is provided on a rear end side of the crankcase 14 at a position lower than that of the engine hanger 13.

A rear wheel 17 is supported on a rear end portion of the rear swing arm 16. A driven sprocket 18 of the rear wheel 17 is driven by a main sprocket 20 of the crankcase 14 through a chain 19.

Figure 1:
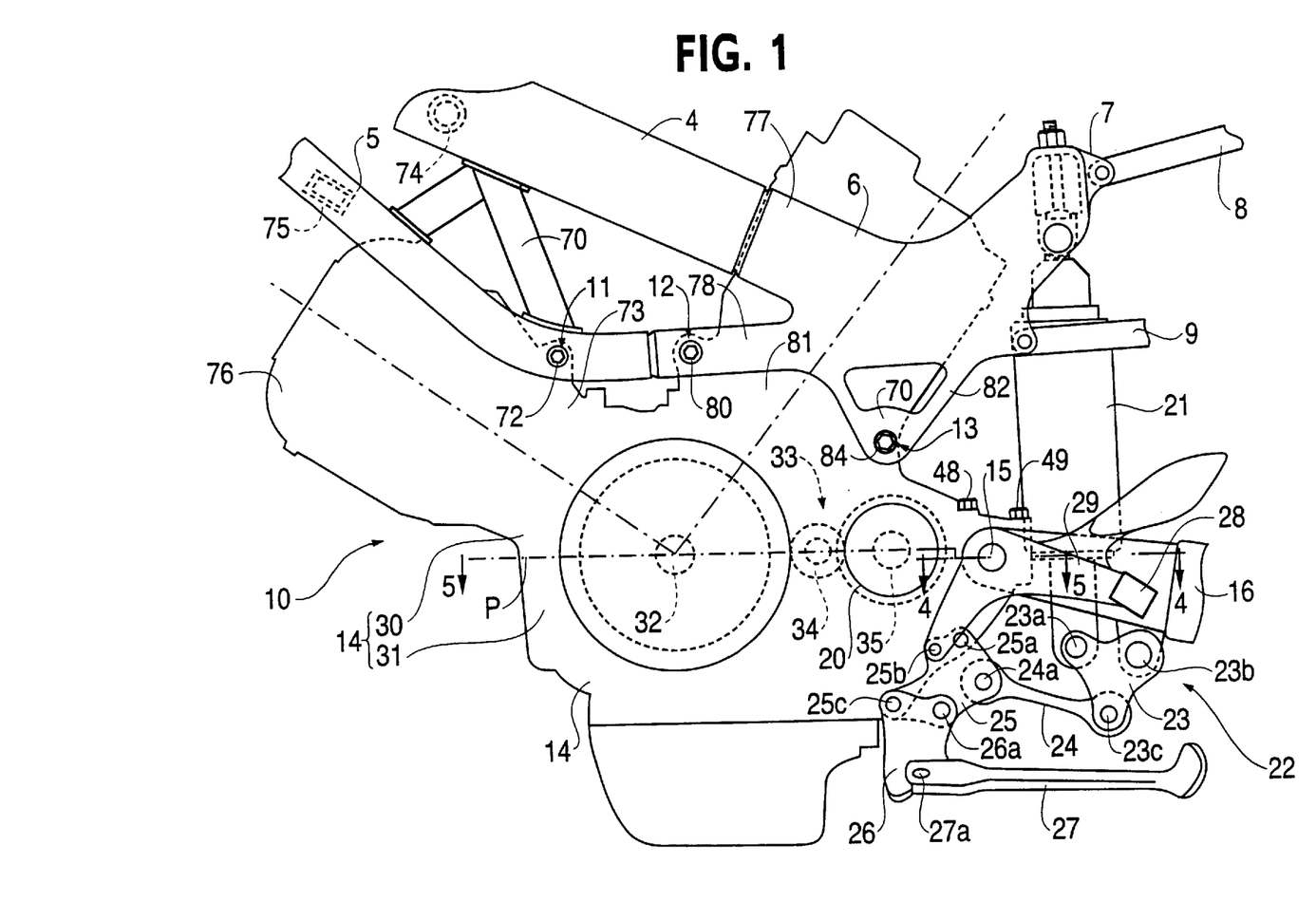
FIG. 1 is an enlarged side view of an engine portion.

As is apparent from FIG. 1, a shock absorber 21 is provided in an upright position as a rear wheel suspension. An upper end portion of the damper 21 is supported on the bridge 7, and a lower end portion of the damper 21 is connected to a link plate 23 of a cushion link 22 provided on a lower portion of the rear swing arm 16 with a bolt 23a.

The cushion link 22 is composed of a link plate 23, link arm 24, and a link bracket 25.

The link plate 23 is connected to the lower portion of the rear swing arm 16 with a bolt 23b and is connected to one end of the link arm 24 with a bolt 23c. The other end of the link arm 24 is connected to the link bracket 25 with a bolt 24a.

The link bracket 25 is mounted on a lower portion of a rear end of the crankcase 14 with bolts 25a, 25b and 25c.

A stand bracket 26 is mounted on a lower portion of the link bracket 25 with the bolt 25c and a bolt 26a. The bolt 25c co-fastens the stand bracket 26 with the link bracket 25. A side stand 27 is turnably mounted on a lower portion of the stand bracket 26 with a bolt 27a.

A step 28 is mounted on a rear end portion of a step holder 29 at a position where it is overlapped to a side surface of the rear swing arm 16. A front end portion of the step 28 and the rear swing arm 16 are co-fastened to the crankcase 14 by the pivot shaft 15. The step holder 29 is a member bent substantially in a boomerang shape. A portion of the step holder 29 extends forwardly and downwardly and is co-fastened with the link bracket 25 with the bolt 25b.

The crankcase 14 is vertically divided along the parting plane P into upper and lower halves 30 and 31. The upper and lower halves 30 and 31 are mated and integrally fastened with bolts in the vertical direction.

The crankshaft 32, the main shaft 34 of a transmission 33, and the counter shaft 35 are arranged along the parting plane P and the main sprocket 20 is mounted on one end portion of the counter shaft 35. See FIG. 5.

Figure 3:
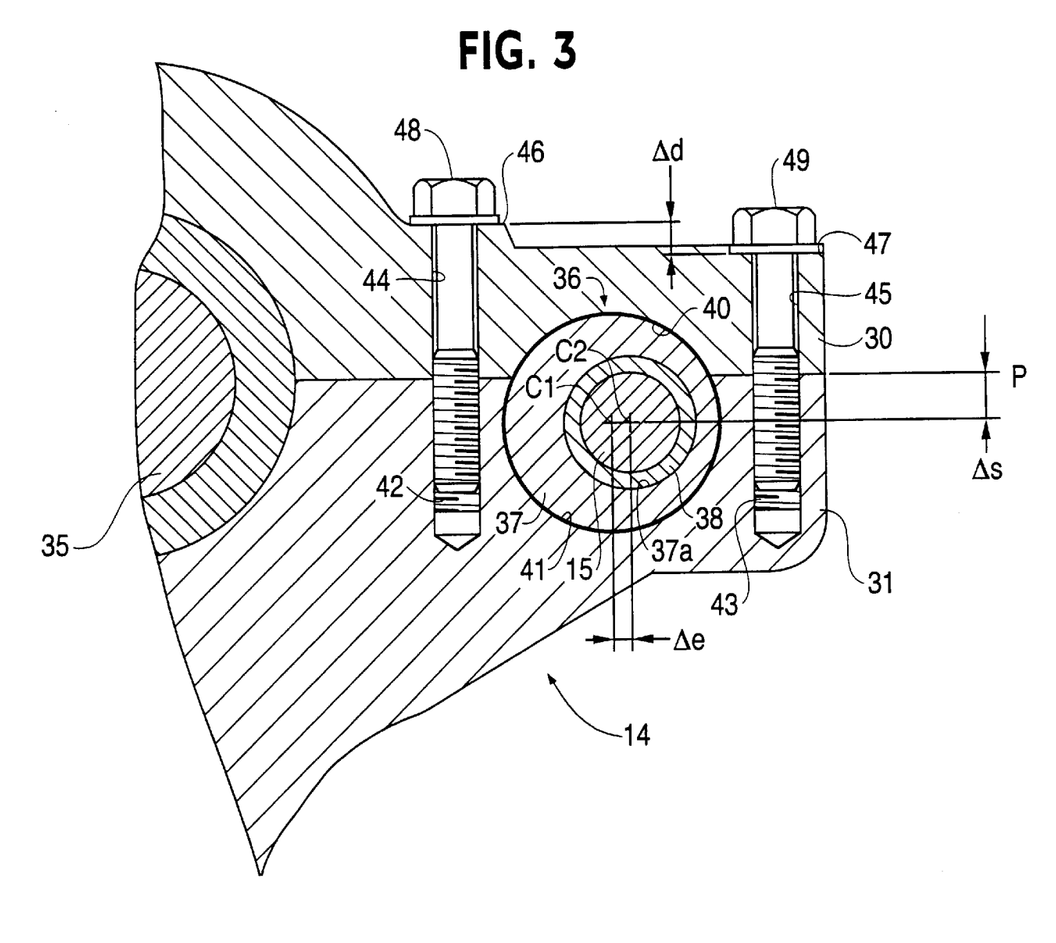
FIG. 3 is a schematic view illustrating arrangement of a pivot portion in a crankcase.

As is apparent from FIG. 3, a pivot portion 36 having a through-hole extending in the width direction of the body is provided at the rear end portion of the crankcase 14. An eccentric cam 37 is fittingly supported in the through-hole of the pivot portion 36.

An eccentric shaft through-hole 37a extends in the axial direction and is formed at the eccentric position of the axis portion of the eccentric cam 37. A pivot collar 38 is fitted in the eccentric shaft hole 37a.

The inside diameter of the pivot collar 38 is substantially equal to the outside diameter of the pivot shaft 15, and the pivot shaft 15 passes through the pivot collar 38.

A center C1 of the pivot portion 36 is offset Δs downwardly from the parting plane P. The eccentric cam 37 can be rolled on its axis in the through-hole of the pivot portion 36. A center C2 of the pivot collar 38 is eccentric Δe from the center C1.

The through-hole of the pivot portion 36 is divided along the parting plane P into an upper portion 40 and a lower portion 41. The upper portion 40 on the upper half 30 side is a recessed groove which extends in the width direction of the body and which has a circular-arc shorter than the half-circle of the through-hole in cross-section. The lower portion 41 on the lower half 31 side is a recessed groove which extends in the width direction of the body and which has a circular-arc longer than the half-circle of the through-hole in cross-section. The upper portion 40 and lower portion 41 are vertically mated to form the round through-hole of the pivot portion 36 extending in the width direction of the body.

Of the fastening portions for fastening the upper half 30 to the lower half 31, those in the vicinity of the pivot portion 36 are provided in front of and behind the through-hole of the pivot portion 36, that is, in such a manner that the through-hole is put therebetween.

Threaded holes 42 are formed in the lower half 31 in such a manner as to be positioned in front of and behind the lower portion 41. Through-holes 44 and 45, which correspond to the threaded holes 42 and 43 respectively, are formed in the upper half 30 in such a manner as to be positioned in front of and behind the upper portion 40.

The through-hole 44 in front of the pivot portion 36 is longer in length than the through-hole 45 behind the pivot portion 36. A seat portion 46, formed on an upper end side of the through-hole 44, is Δd higher than a seat portion 47 formed on an upper end side of the through-hole 45.

The through-holes 44 and 45 are matched with the threaded holes 42 and 43 and fastened therewith from top using bolts 48 and 49, respectively.

The fastening bolt 48 in front of the pivot portion 36 is longer than the fastening bolt 49 behind the pivot portion 36. More specifically, the crankcase fastening portion formed in front of the pivot portion 36 is Δd thicker than the crankcase fastening portion formed behind the pivot portion 36.

When the eccentric cam 37 is rotated, the center position C2 common to both the pivot collar 38 and the pivot shaft 15 supported inside the pivot collar 38 is moved in the vertical and longitudinal directions of the body. The pivot position exerts an effect mainly on the running performance and can be adjusted by changing the vertical position of the center C2. The tension of the chain 16 can be adjusted by changing the longitudinal position of the center C2.

Figure 4:
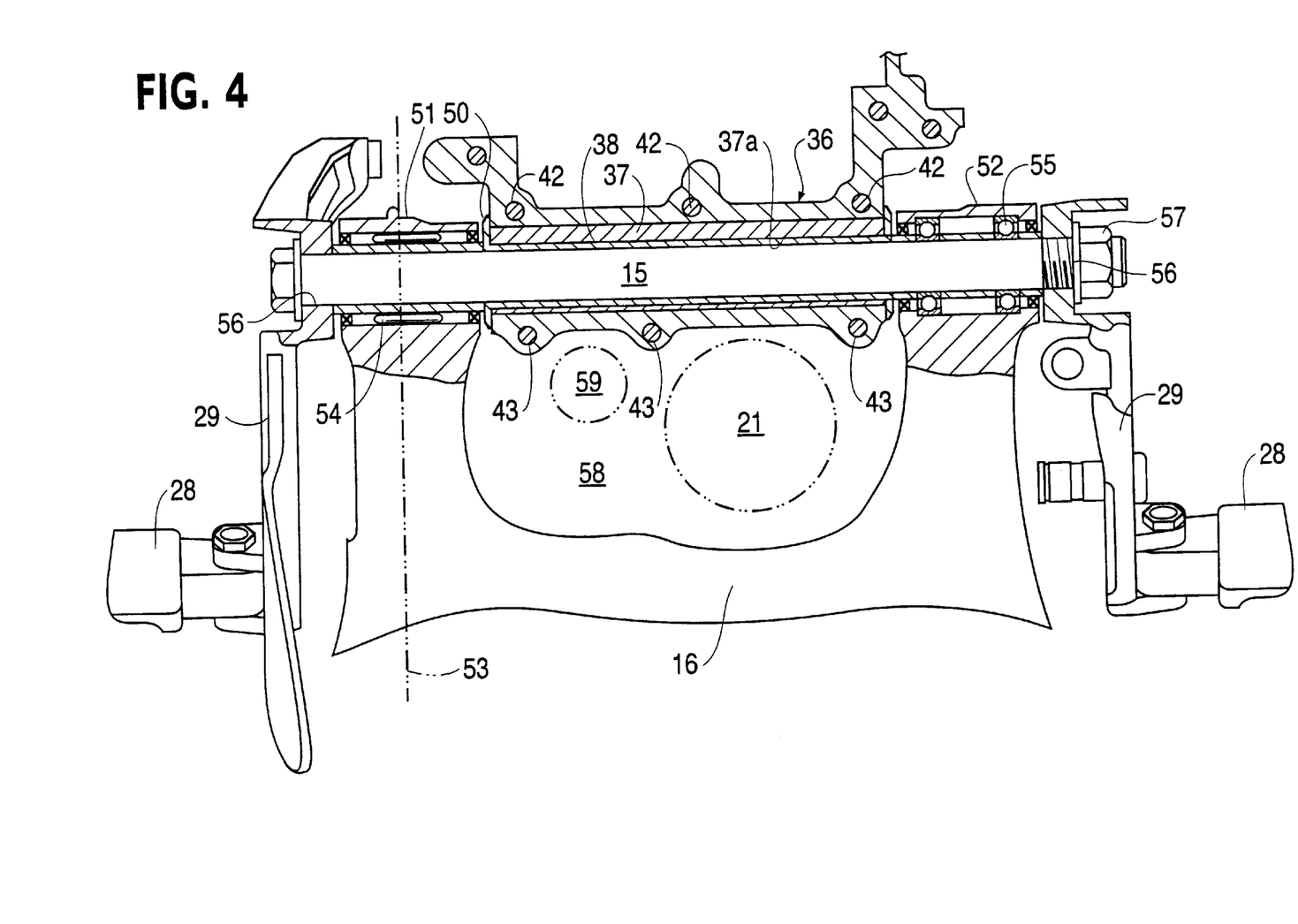
FIG. 4 is an enlarged sectional view taken on line 4—4 of FIG. 1.

Referring to FIG. 4, a flange 50 for turning operation is provided at least at one end of the pivot collar 38. The pivot collar 38 is inserted in the eccentric cam 37. The eccentric cam 37 is fitted in the through-hole of the pivot portion 36. Bearing portions 52 and 51 for supporting the rear swing arm 16 are provided on right and left sides of the through-hole in such a manner as to be coaxial with respect to the through-hole.

A needle bearing 54 is provided in the left side bearing portion through which a chain line 53 of the chain 19 passes. A ball bearing 55 is provided in the right side bearing portion 52. Mounting holes 56 of right and left step holders 29 are disposed outside the bearing portions 52 and 51 in such a manner as to be coaxial with respect to the bearing portions 52 and 51. The pivot shaft 15, in the form of a bolt, is made to pass, from the left, through the mounting holes 56, the bearing portions 51 and 52, and the pivot collar 38, and the pivot shaft 15 is fastened with a nut 57 on the right side.

In front of the rear swing arm 16, the damper 21 and an exhaust pipe 59 vertically passes through a space 58 between the right and left bearing portions 52 and 51.

Here, three pieces of the threaded holes 43 provided in the fastening portion behind the pivot portion 36 are spaced at non-equal intervals in the width direction of the body. The center threaded hole 43 is offset leftwardly in order to avoid interference with the damper 21, and further it is not symmetric to the center threaded hole 42 provided in the fastening portion in front of the pivot portion 36.

Figure 5:
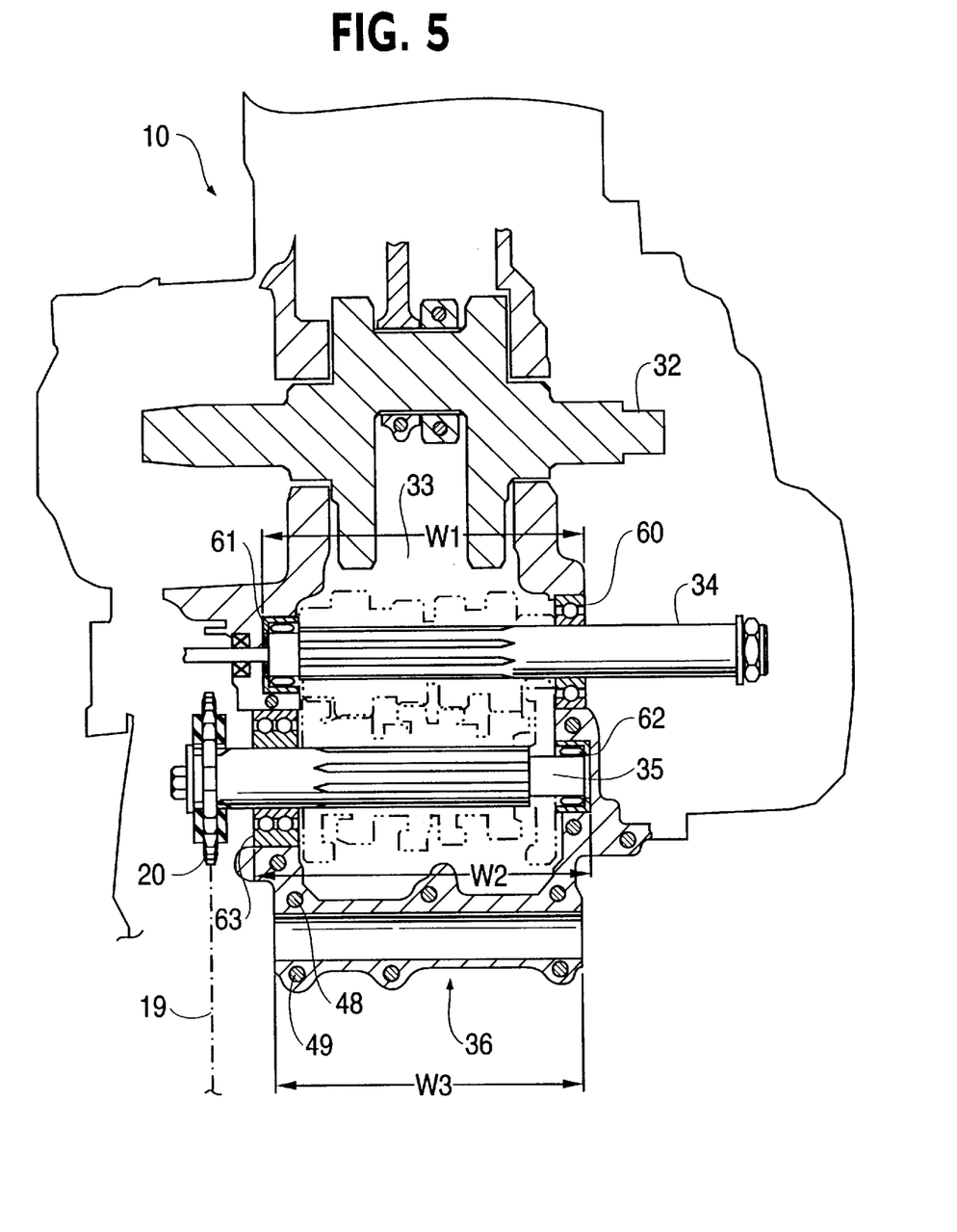
FIG. 5 is an enlarged sectional view of the engine portion, taken on line 5—5 of FIG. 1.

A width W1 between a ball bearing 60 and needle bearing 61 for supporting both ends of the main shaft 34 in the width direction of the body, is nearly equal to a width W2 between a needle bearing 63 and a ball bearing 64 for supporting both ends of the counter shaft 35 in the width direction of the body. The width W1 is also nearly equal to a width W3 between end surfaces of the pivot portion 36 in the width direction of the body.

Figures 6A, 6B:
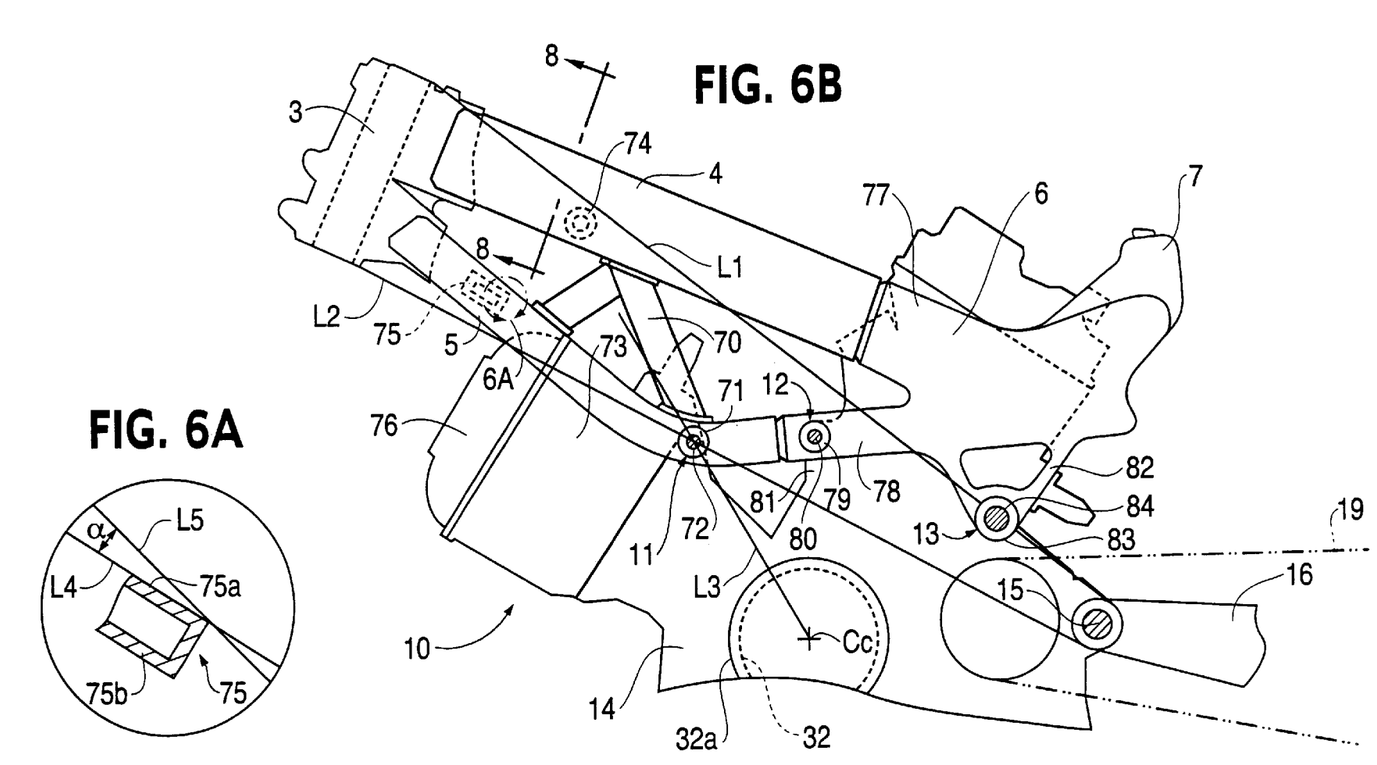
FIG. 6 is an enlarged side view of essential portions of a body disposed around a body frame.
Figure 7:
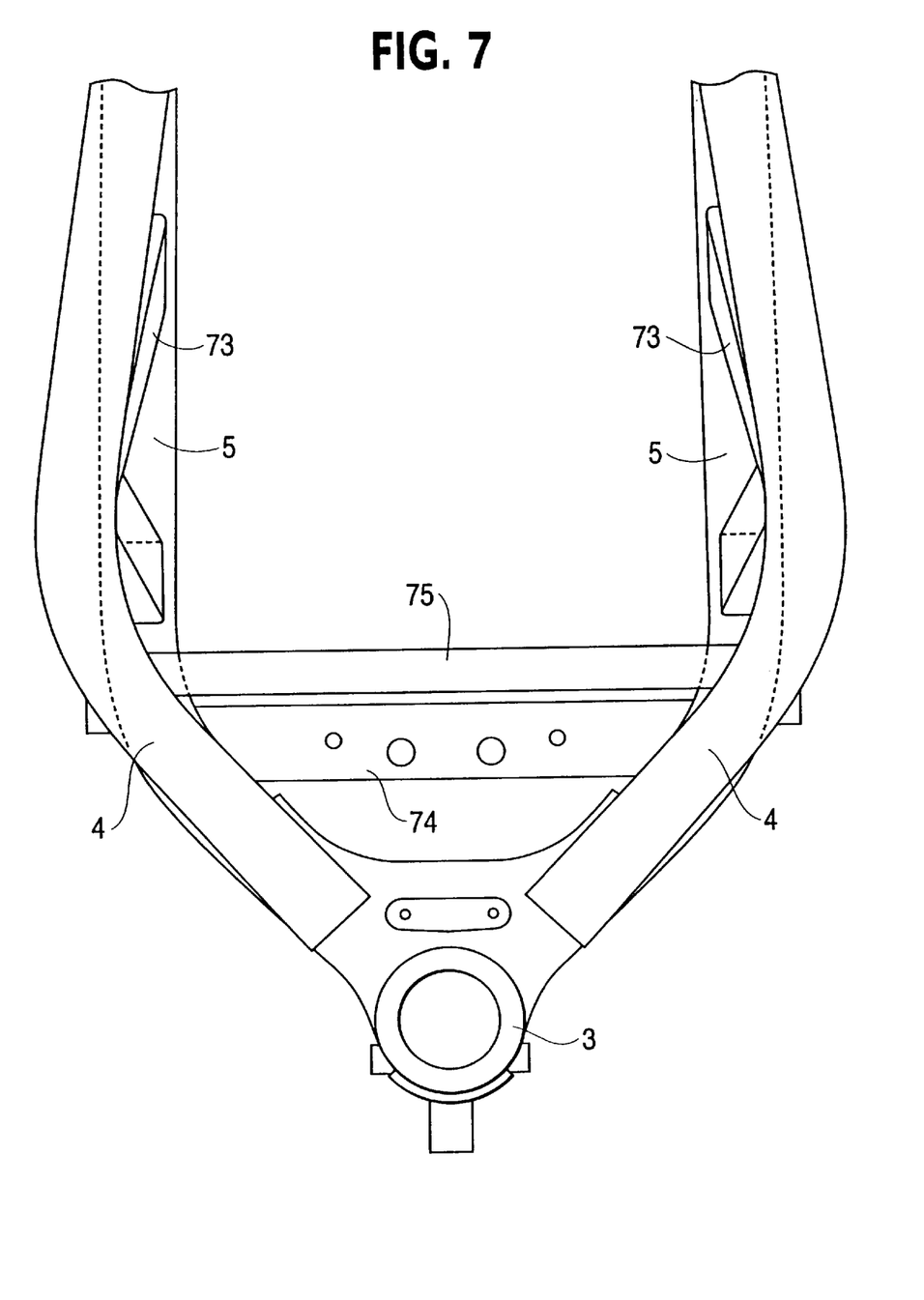
FIG. 7 is a top view of the body frame.
Figure 8:
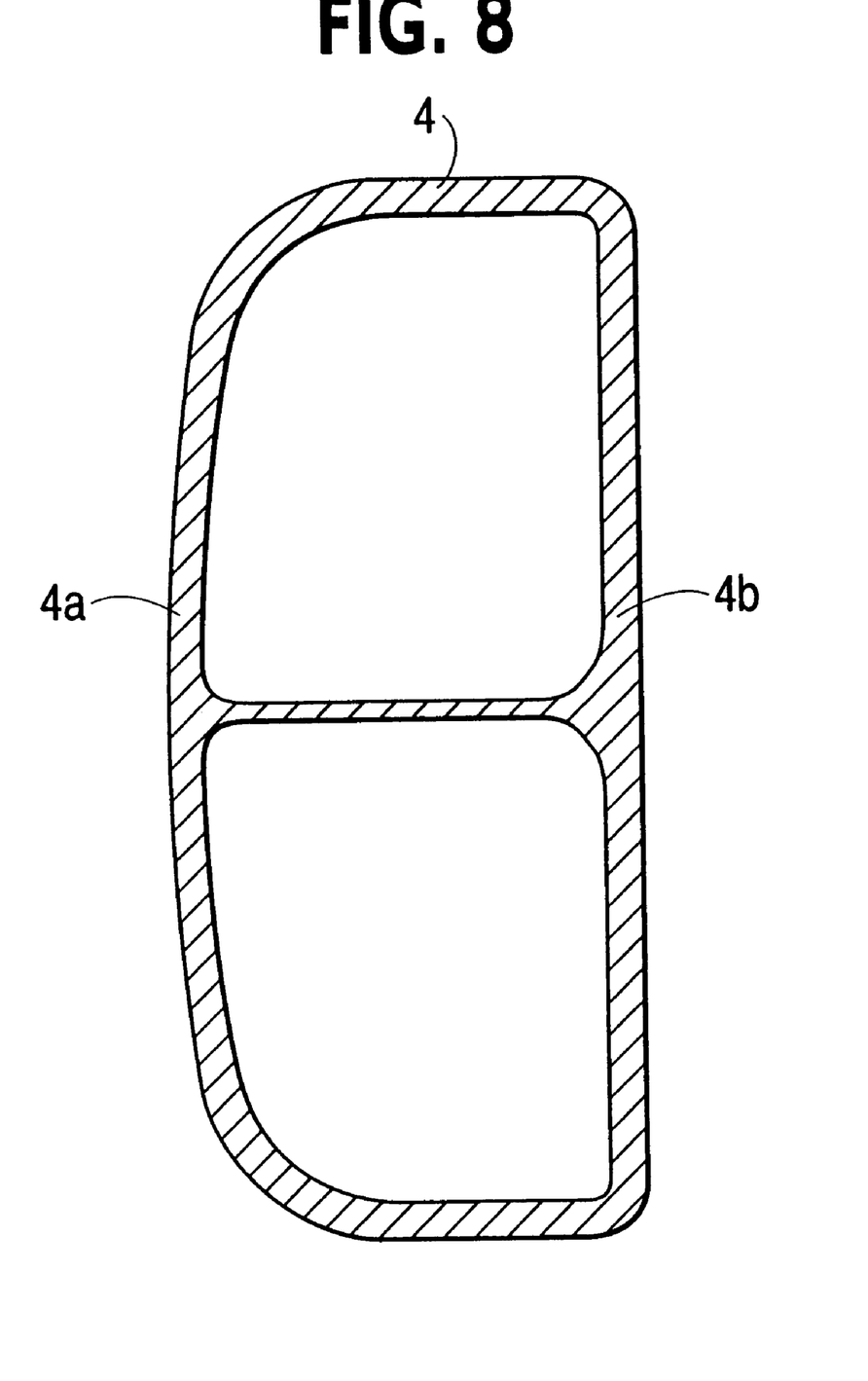
FIG. 8 is an enlarged sectional view taken on line 8—8 of FIG. 6.

Next, the body frame structure will be more fully described with reference to FIGS. 6, 7 and 8. Referring to FIG. 6, a virtual or longitudinal line L1 connects an upper portion of the pivot portion 36 to an upper rear end of the head pipe 3, and a virtual or longitudinal line L2 connects a lower portion of the pivot portion 36 to a lower rear end of the head pipe 3. The engine hangers 11, 12 and 13 are disposed in a region surrounded by the virtual or lines L1 and L2, or in the vicinity of the region.

A reinforcing member 70 is provided along the extension of a line L3 connecting the first engine hanger 11 to the center of the crankshaft 32. The reinforcing member 70 connects the main frame 4 to the sub-frame 5 in an approximately V-shape in a side view.

Each of the main frame 4 and sub-frame 5 is formed from a light alloy such as an aluminum alloy by a drawing process. As shown in FIG. 8, the main frame 4 has an approximately D-shaped cross-section as a whole in which an outer side surface 4a thereof is curved and an inner side surface 4b thereof is flattened.

The first engine hanger 11 has a collar 71 which is welded to an inner side surface of the sub-frame 5. See FIG. 6. An inside diameter of the collar 71 is slightly larger than a mounting bolt 72. See FIG. 6. A front bank portion 73 of the crankcase 14 constituting the engine 10 is fastened and mounted on the first engine hanger 11 using the mounting bolt 72.

A cross-pipe 74 is formed of a round pipe and is provided between right and left main frames 4. A cross-pipe 75 is formed of a square pipe having a rectangular cross-section and is provided between the right and left sub-frames 5.

A pair of opposed long-sides 75a and 75b of the cross-pipe 75 in the transverse cross-section are inclined at an angle α in order that parallel lines L4 in the length direction of the long-sides 75a and 75b become more largely apart upwardly from a longitudinal axial line L5 of the sub-frame 5 as the parallel lines L4 extend on the rear side. A cylinder head cover 76 is positioned on the rear side of the parallel lines L4 of the long-sides 75a and 75b of the cross-pipe 75.

The rear plate 6 is formed from a light alloy such as an aluminum alloy by casting or forging. A front portion of the rear plate 6 is forked into upper and lower joint portions 77 and 78 which are respectively fitted to rear end portions of the main frame 4 and sub-frame 5.

A seat portion 79 constituting each second engine hanger 12 is integrally formed on the lower joint portion 79. A front side of a rear bank portion 81 of the crankcase 14 constituting the engine 10 is mounted on the seat portion 79 by using a fastening mounting bolt 80. See FIG. 6.

A projecting portion 82 projects downwardly in an approximately triangular shape and is integrally provided on the rear portion of the rear plate 6. A seat portion 83 constituting the third engine hanger 13 is integrally formed on the projecting portion 82. A rear side of the rear bank portion 81 is mounted on the seat portion 83 by fastening using a mounting bolt 84. See FIG. 6.

These seat portions 79 and 83 are machined after formation of the rear plate 6. An inside diameter of a through-hole of each seat portion is set at such a value as to make smaller a mounting looseness of each of the mounting bolts 80 and 84.

The function of the embodiment of the present invention will be described below. As shown in FIGS. 1 and 3, the crankcase 14 is vertically divided into the upper half 30 and lower half 31 and the pivot portion 36 is provided along the parting plane P thereof, so that the assembling performance of the pivot portion 36 can be improved.

In particular, since the crankshaft 32, main shaft 34, counter shaft 35, and pivot portion 36 are arranged substantially on a straight line along the parting plane P, it is possible to improve the assembling performance of each shaft and the twisting rigidity of a peripheral portion of the pivot shaft.

The upper half 30 and lower half 31 are vertically mated and vertically fastened to each other using the bolts 48 and 49 in front of and behind the pivot collar 38 provided in the pivot portion 36. Accordingly, even if the crankcase 14 is made of an aluminum alloy, the permanent set in fatigue of an aluminum seat surface can be prevented.

Since the fastening portion using the longer bolt 48 on the front side of the body is Δd thicker than the fastening portion using the short bolt 49 on the rear side of the body, the fastening performance and the twisting rigidity of the pivot collar 38 can be improved.

Since the center C2 of the pivot collar 38 is offset Δs downwardly from the parting plane P, the rigidity can be improved. The center C2 may be offset either upwardly or downwardly from the parting plane P. However, it is advantageously offset downwardly, that is, in the loading direction.

Since the width W3 between the end surfaces of the pivot portion 36 in the width direction of the body is substantially equal to the W1 between the bearings of the main shaft 34 in the width direction of the body, and to the width W2 of the bearings of the counter shaft 35 in the width direction of the body, the fastening performance and twisting rigidity of the pivot collar 38 can be improved.

Since the eccentric cam 37 for eccentrically supporting the pivot collar 38 is provided in the pivot portion 36, it is possible to eliminate the necessity of the provision of a frame part for supporting the eccentric cam 37.

In particular, when the same engine is used for a different kind of motorcycle, even if the mounting position and angle of the engine are changed, the optimum pivot position can be adjusted without use of any additional members, resulting in an increased flexibility.

Since the step holders 29 are mounted on the side surfaces of the crankcase 14 by co-fastening them with the rear swing arm 16 to the pivot portion 36 using the pivot shaft 15, it is possible to mount the steps 28 on the engine having a high rigidity, and hence to eliminate the necessity of an enlargement of the mounting portions thereof on the engine side.

Since the rear swing arm 16 is directly connected to the crankcase 14, the related art pivot frame can be omitted and a relatively large article storing space can be ensured under the rear swing arm 16. For example, the cushion link 22, stand bracket 26 and the like can be easily disposed in such a space.

Since the stand bracket 26 and step holder 29 can be co-fastened with the link bracket 25 with the bolts 25b and 25c, the assembling performance can be improved by making use of various functions of the link bracket 25.

Since the pivot portion 36 is directly provided on the crankcase 14, the related art pivot frame can be omitted. This makes it possible to eliminate the necessity of extending the pivot frame up to the lower side of the body for providing a relatively large pivot portion, and hence to make narrower or thinning the width of the body, particularly the width of the lower portion of the body and to reduce the weight.

As is apparent from FIG. 6, the engine hangers 11, 12 and 13 are disposed in a region defined by the virtual lines, or oblique longitudinally extending lines L1 and L2 connecting the pivot portion 36 to the head pipe 3 or in the vicinity of the region.

The region surrounded by the virtual lines L1 and L2 is a range of connecting, along the shortest route, the pivot portion 36 to the head pipe 3 at which a force applied from the front wheel 1 and the rear wheel 17 to the body side is concentrated. It is also a portion in which the engine 10 is least susceptible to deformation due to a twisting force applied from the rear wheel 17 to the pivot portion 32.

Accordingly, in the case where the engine 10 is connected to the sub-frame 5 and the rear plate 6 in the above region or in the vicinity thereof, the twisting force applied from the rear wheel 17 to the pivot portion 32 is partially absorbed by the engine 10, and the remaining twisting force is transmitted from the engine 10 to the sub-frame 5 and the rear plate 6 through the engine hangers 11, 12 and 13 and then absorbed by the body frame side.

Since the transmission of the twisting force to the body frame is performed in the region where the engine 10 is least susceptible to deformation due to the twisting force, it is not particularly required to reinforce the engine hangers 11, 12 and 13. Also, since the connecting portions of the engine 10 side to the engine hangers are provided on the crankcase 14, it is possible to easily ensure the rigidities of the connecting portions.

Since the reinforcing member 70 is provided along the extension of the line L3 connecting the first engine hanger 11 to the crankshaft 32, the reinforcing member 70 functions most effectively in terms of strength and rigidity to vibration transmitted from the engine 10 to the body frame side through the first engine hanger 11, and consequently it is possible to reduce the weight of the entire body frame.

Since the engine hangers 11, 12 and 13 are machined after formation of the rear plate 6 by casting or forging, it is possible to significantly improve the mounting accuracy as compared with the case of welding the engine hangers to the body frame.

Accordingly, it is possible to significantly reduce a mounting looseness formed between the inside diameter of the through-hole of each of the seat portions 79 and 83 and the outside diameter of each of the mounting bolts 80 and 84, and hence to significantly reduce a connecting looseness between the engine 10 and the body frame.

At this time, since the first engine hanger 11 is welded, the diameter of the through-hole of the first engine hanger 11 is set at a relatively large value in consideration of variations in welding work and thermal strain due to welding. However, such a structure of the first engine hanger 11 is allowable because the looseness is reduced on the second engine hanger 12 side and the third engine hanger 13 side. As a result, it is possible to eliminate the post-processing for improving the accuracy, and hence to improve the productivity.

Since the main frame 4 is formed in an approximately D-shape in cross-section as a whole, it is possible to prevent a plane-resonance phenomenon in which there occurs noise due to resonance of planes as in the related art main frame in which the opposed two sides are parallel. As a result, it is possible to reduce or omit the degree of use of a noise absorber, and ensure a sufficient bending characteristic because of a suitable planar rigidity. For example, such a structure of the main frame 4 is significantly effective as compared with a structure having an elliptic cross-section which causes a difficulty in bending work. A pair of opposed long-sides of the cross-pipe 75 in the transverse cross-section are inclined in the length direction such that parallel lines of the long-sides become more spaced apart upwardly from a longitudinal axial line of the sub-frame 5 as the parallel lines extend on the rear side. Accordingly, the cross-pipe 75 can be disposed at an ideal position without interference with the opening/closing of the cylinder head cover 76.

The present invention is not limited to the above-described embodiment, and it is to be understood that many changes may be made without departing from the scope or spirit of the invention. For example, the eccentric cam 37 itself can be used as the pivot collar.

The adjustment by the eccentric cam 37 may be used for vertical adjustment of the pivot shaft, and the tension adjustment of the chain 19 may be performed by drawing the chain on the axle side as in a related art motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body structure of a motorcycle comprising:
a head pipe turnably supporting a front fork supporting a front wheel;
a body frame extending rearwardly from said head pipe;
an engine supported downwardly from said body frame;
a rear swing arm having a front end portion rockably supported on a rear portion of a crankcase of said engine through a pivot shaft; and
a rear wheel supported on a rear end portion of said rear swing arm;
wherein said crankcase is divided into upper and lower parts, and a pivot portion for supporting said pivot shaft is provided along a parting plane of said upper and lower parts of said crankcase.

2. The body structure of a motorcycle according to claim 1, wherein said pivot portion supports a pivot collar through which said pivot shaft passes, and said upper and lower parts of said crankcase are vertically fastened to each other at fastening portions positioned in front of and behind said pivot collar.

3. The body structure of a motorcycle according to claim 2, wherein a wall thickness of said fastening portion in front of said pivot collar on the front side of said body is larger than that of said fastening portion behind said pivot collar on the rear side of said body.

4. The body structure of a motorcycle according to claim 2, wherein a center of a pivot collar is offset either upwardly or downwardly from said parting plane.

5. The body structure of a motorcycle according to claim 1, wherein a crankshaft, a main shaft, a counter shaft, and a pivot portion are arranged substantially on a straight line along said parting plane.

6. The body structure of a motorcycle according to claim 1, wherein a width between axial end surfaces of said pivot portion is substantially equal to a width between bearings supporting both ends of a main shaft of a transmission and to a width between bearings supporting both ends of a counter shaft of said transmission.

7. The body structure of a motorcycle according to claim 1, wherein an eccentric cam for eccentrically supporting said pivot shaft is provided in said pivot portion.

8. The body structure of a motorcycle according to claim 1, wherein step holders and said rear swing arm are co-fastened to side surfaces of said crankcase using said pivot shaft.

9. The body structure of a motorcycle comprising:
a head pipe turnably supporting a front fork supporting a front wheel;
a body frame extending rearwardly from said head pipe;

an engine supported downwardly from said body frame;

a rear swing arm having a front end portion rockably supported on a rear portion of a crankcase of said engine through a pivot shaft; and a rear wheel supported on a rear end portion of said rear swing arm;

wherein connecting portions for connecting said engine to said body frame are provided in a region surrounded by upper and lower oblique longitudinally extending lines connecting a pivot portion of said crankcase to upper and lower end portions of said head pipe or in the vicinity of said region.

10. The body structure of a motorcycle according to claim 9, wherein said portions for connecting said engine to said body frame are provided on said crankcase.

11. The body structure of a motorcycle according to claim 1, wherein a center of said pivot portion is downwardly offset from said parting plane of said upper and lower parts of said crankcase.

12. The body structure of a motorcycle according to claim 1, wherein said body frame comprises two rearwardly extending frame parts, at least one of said two rearwardly extending frame parts having a generally D-shaped cross-section.

13. The body structure of a motorcycle according to claim 1, wherein said two rearwardly extending frame parts are connected with a reinforcing member forming essentially a V-shape therebetween.

14. The body structure of a motorcycle according to claim 9, wherein said connecting portions are provided at least on a rear portion of a front cylinder head of said engine and a front portion of a back cylinder head of said engine.

15. The body structure of a motorcycle according to claim 14, wherein an additional connecting portion is provided on a rear portion of said back cylinder head of said engine.

* * * * *